United States Patent Office 3,102,976
Patented Sept. 3, 1963

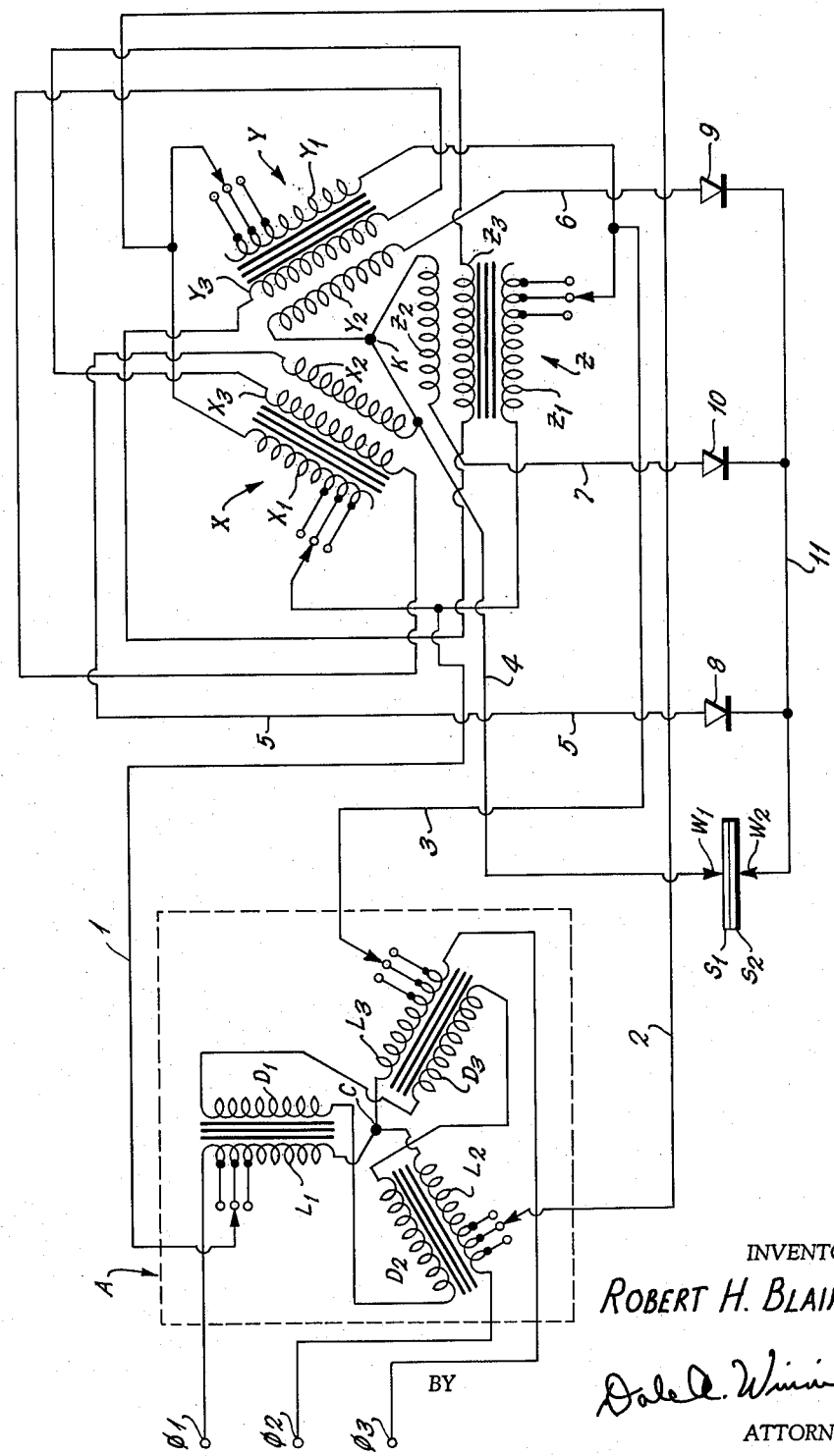

3,102,976
WELDING CIRCUITRY
Robert H. Blair, Bay City, Mich., assignor to Helfrecht
Machine Company, Saginaw, Mich., a partnership
Filed Feb. 6, 1961, Ser. No. 87,366
6 Claims. (Cl. 321—9)

The present invention relates to a new and novel power supply system for resistance welding equipment and more particularly to such a system employing silicon rectifier means. In resistance welding operations, it is generally necessary to convert a conventional power supply in the form of three-phase alternating current into a direct current for operating the welding equipment. Accordingly, such systems employ rectifier means, and the prior art has employed magnesium-copper sulphide type rectifiers for this purpose. These types of rectifiers suffer certain inherent disadvantages which have limited their usefulness in welding systems.

Magnesium-copper sulphide type rectifiers often become contaminated by moisture. This moisture may be formed either as condensation from the air or from water leaks, and when such water comes in contact with the magnesium-copper sulphide cell, a chemical reaction takes place which impairs and eventually destroys the rectification action.

Magnesium-copper sulphide rectifiers also limit the design of the D.C. portion of the supply system since the D.C. voltage must be limited to approximately 5 volt peaks. This is a major limitation, particularly in applications of three-phase welding wherein portable welding guns are employed since the cable resistance must also be considered in the D.C. voltage requirements.

The disadvantages inherent in systems employing magnesium-copper sulphide rectifiers may be overcome by employing silicon power diodes as the rectifier means in place thereof. Silicon power diodes are free from moisture contamination, and the rectification action is not impaired by moisture. In addition, a power supply system incorporating silicon power diodes need not be limited to 5 volt peaks, but the silicon diode design can be rated upwards in accordance with the circuit requirements. It is accordingly evident that the utilization of silicon power diodes provides major advantages in a power supply system for welding equipment.

Although silicon diodes successfully overcome certain problems existing in the prior art, the employment of such silicon diodes in welding circuits has been limited due to the fact that when an inverse voltage, transient or otherwise, exceeds the rated inverse voltage of a diode, the diode is irrepairably damaged. This is due to the fact that a silicon diode has no self-healing characteristic as does a magnesium-copper sulphide cell. It is accordingly essential that means be provided in the power supply system to prevent transient and harmonic voltages from exceeding the rated inverse voltage of the silicon diodes.

The power supply system of the present invention is of the transformer-rectifier type, and a three-phase alternating power supply is connected to the input of an autotransformer. The output of the autotransformer is in turn connected with a second transformer means comprising a plurality of single-phase welding transformers having the primary and secondary coils thereof connected in a novel manner.

The output of the second transformer means is in turn connected to a pair of welding electrodes through a bank of silicon diodes to provide the required D.C. resistance welding current. The second transformer means actually comprises three individual single-phase transformers, the primary windings of which are delta-connected and the secondary windings of which are Y-connected. The autotransformer itself is Y-connected and the output thereof is connected with the primary coils of the second transformer means. With this novel interconnection, the delta connected primary coils of the second transformer means serve to filter the transient and harmonic voltages to a certain extent.

In order to protect the silicon diodes, the autotransformer is provided with tertiary coil means including three windings delta-connected and operatively associated with the coils of the autotransformer. A delta-connected tertiary coil means is also operatively associated with the coils of the second transformer means. The purpose of each of these delta-connected tertiary coils is to circulate currents as a result of non-sinusoidal voltage currents. Sinusoidal voltages in a three-phase circuit instantaneously total zero voltage. Harmonic voltages superimposed on the 60 cycle fundamental produce circulating exciting currents in the delta-connected tertiary coil means to dissipate the harmonic voltages. It is particularly the third harmonic and multiples thereof which produce dangerous peaks of voltage and these peaks are eliminated by the delta-connected tertiary coil means in each case since the tertiary coil means shortcircuits the harmonic components from the Y-connected windings and thereby confines such currents to the transformer windings themselves.

Accordingly, the provision of these delta-connected tertiary coil means enables the welding system to incorporate silicon diode rectifier means without the danger of these diodes being destroyed by excessive voltage peaks exceeding the expected peaks of the fundamental wave where such excessive peaks are attributable to wave form harmonics.

An object of the present invention is to provide a new and improved power supply system for resistance welding equipment incorporating rectifier means which is substantially free from moisture contamination.

Another object is the provision of a new and improved power supply system for resistance welding equipment incorporating rectifier means which provides freedom of the D.C. voltage circuit design, and which permits the D.C. voltage to operate at higher peaks than is permissible with other types of rectifiers.

A further object of the invention is to provide a power supply system for resistance welding equipment incorporating silicon diodes and wherein means is provided for preventing inverse voltages greater than the rated inverse voltage of the silicon diodes from reaching the silicon diodes.

Other objects and many attendant advantages of the invention will become more apparent when considered in connection with the accompanying drawing which illustrates schematically a preferred embodiment of the present invention.

Referring now to the drawings the terminals, $\phi 1$, $\phi 2$ and $\phi 3$ are illustrated. The characters $\phi 1$, $\phi 2$ and $\phi 3$ represent the three terminals in a conventional three-phase alternating current power supply. These three terminals are connected to the input terminals of a three-phase auto-transformer indicated generally by A having a three-phase winding divided into legs $L_1$, $L_2$ and $L_3$ which are tapped to permit adjustment of the output voltages through leads 1, 2 and 3 respectively which are in turn connected with the second transformer means hereinafter described. These tapped windings permit fine step adjustment of the D.C. welding current.

Legs $L_1$, $L_2$, $L_3$ of the autotransformer are Y-connected and joined together at a common terminal C. Autotransformer A as described thus far is of a relatively conventional and well-known construction in the art.

A particular feature of the present invention is the provision with the autotransformer A of a three-phase tertiary winding which is delta-connected and includes the winding sections $D_1$, $D_2$ and $D_3$ which are connected together as shown in the drawing. The purpose of this delta-connected tertiary coil means is to remove transient and harmonic voltages from the three-phase secondary voltages of the autotransformer. The leads 1, 2 and 3 couple the autotransformer with three mutually identical single-phase welding transformers indicated generally by reference characters X, Y and Z.

Each of these welding transformers includes a primary coil indicated by reference numerals $X_1$, $Y_1$ and $Z_1$ which are identical and comprise tapped windings delta-connected with one another and further coupled to the leads 1, 2 and 3 as seen in the drawing.

Each of transformers X, Y and Z also includes a secondary winding indicated respectively by reference characters $X_2$, $Y_2$ and $Z_2$ which are also identical and are Y-connected at a common neutral terminal K which serves as one output terminal of the second transformer means. This common neutral terminal K is connected through a lead 4 to a first welding electrode $W_1$.

The ends of each of the secondary windings $X_2$, $Y_2$ and $Z_2$ opposite to the ends which are connected to the common neutral terminal K are connected through leads 5, 6 and 7 to the silicon diodes 8, 9 and 10 respectively. The diodes are in turn connected with a common lead 11 which supplies the output currents from the diodes to a second welding electrode $W_2$.

The welding electrodes $W_1$ and $W_2$ may be of any conventional construction, and as shown, these welding electrodes are applied to the opposite surfaces of a pair of superposed sheets of material $S_1$ and $S_2$ which it is desired to weld to one another.

Each of the individual transformers X, Y and Z is provided with a tertiary winding, these windings being mutually identical and being indicated by reference characters $X_3$, $Y_3$ and $Z_3$. These latter-mentioned windings are coupled together at their ends to form a delta-connected tertiary coil means. These windings are securely brazed together to provide a high degree of reliability in protecting the silicon diode rectifier means.

It is apparent from the foregoing that there is provided a new and novel power supply system for resistance welding equipment wherein the silicon diode rectifiers provide freedom from moisture contamination and enable freedom of the D.C. voltage circuit design enabling the D.C. voltage to be operated at higher peaks than in prior art systems. The delta-connected tertiary coil means associated with the autotransformer and the second transformer means also effectively protects the silicon diodes by preventing dangerous peaks of voltage from reaching the diodes.

It should be noted that the primary windings $X_1$, $Y_1$ and $Z_1$ are delta-connected to filter out the transient and harmonic voltages, and that greater cancellation of the transient and harmonic voltages is ensured by the delta-connected tertiary coil means $X_3$, $Y_3$ and $Z_3$.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A power supply system comprising three-phase Y-connected autotransformer means, second transformer means, said second transformer means including primary coil means and secondary coil means, said primary coil means being delta-connected and said secondary coil means being Y-connected, the output of said autotransformer means being connected to the primary coil means of said second transformer means, silicon rectifier means, the output of said secondary coil means of said second transformer means being connected to said silicon rectifier means, and delta-connected unloaded tertiary coils in at least one of said transformer means for short circuiting third and related harmonic components.

2. A direct-circuit power supply system comprising a three-phase Y-connected autotransformer, a first delta-connected tertiary coil means operatively associated with said autotransformer to remove transient and harmonic voltages from the three-phase secondary voltages of the autotransformer, second transformer means including primary coil means and secondary coil means, said primary coil means being delta-connected and said secondary coil means being Y-connected, the output of said autotransformer being connected to the primary coil means of said second transformer means, silicon rectifier means, the output of said secondary coil means of said second transformer means being connected to said silicon rectifier means, and second delta-connected tertiary coil means operatively associated with the coil means of said second transformer means for preventing transient and harmonic voltages from reaching said silicon rectifier means.

3. A direct-current power supply system comprising a three-phase alternating current power supply, a three-phase autotransformer including Y-connected coils, said autotransformer being connected with said power supply, said coils of the transformer being step-tapped, second transformer means including primary coil means and secondary coil means, said primary coil means being delta-connected, said secondary coil means being Y-connected, said primary coil means being step-tapped and being operatively connected to the coils of said autotransformer, delta-connected unloaded tertiary coil means operatively associated with the coils of said autotransformer and said second transformer means for removing transient and harmonic voltages from the outputs of said autotransformer and said second transformer means, silicon power diode means, the output of said second transformer means being connected with said silicon power diode means.

4. A power supply system for resistance welding equipment comprising a three-phase Y-connected autotransformer adapted to be connected to a source of three-phase alternating electric current, first delta-connected tertiary coil means operatively associated with said autotransformer to remove transient and harmonic voltages from the three-phase secondary voltages of the autotransformer, second transformer means comprising three single phase welding transformers each of which includes a primary coil and a secondary coil, said primary coils being delta-connected and said secondary coils being Y-connected, the primary coils of said second transformer means being connected with the output of said autotransformer, second delta-connected tertiary coil means operatively associated with the coils of said second transformer means for preventing transient and harmonic voltages in the output thereof, silicon power diode rectifier means, the output of said second transformer means being connected with said rectifier means.

5. A system as defined in claim 4, wherein each of said tertiary coil means is unloaded.

6. In combination, a three-phase Y-connected autotransformer, delta-connected tertiary coil means operatively associated with said autotransformer for removing transient and harmonic voltages from the three-phase secondary voltages of the autotransformer, second transformer means comprising three single phase transformers, each of which includes a primary coil and a secondary coil, said primary coils being delta-connected and said secondary coils being Y-connected, delta-connected tertiary coil means operatively associated with the coils of said second transformer means for preventing transient and harmonic voltages from appearing in the output of said second transformer means, a plurality of silicon power diode rectifiers, an output load, one end of each of said secondary coils being connected to said rectifiers and said rectifiers being in turn connected to one end of said load, the opposite ends of each of said secondary coils being connected to a common point which is in turn connected to the other end of said load.

References Cited in the file of this patent

UNITED STATES PATENTS

| | | |
|---|---|---|
| 2,174,392 | Schmer et al. | Sept. 26, 1939 |
| 2,221,576 | Dawson | Nov. 12, 1940 |
| 2,290,682 | Geiselman | July 21, 1942 |
| 2,477,211 | Smith | July 26, 1949 |